Aug. 15, 1950 H. H. STOCKFELD 2,519,004

TAPE PRINTING AND PROJECTING DEVICE

Filed Jan. 15, 1946 3 Sheets-Sheet 1

Inventor
HARRY H. STOCKFELD

By Henninger and Pillare
Attorney

Aug. 15, 1950 H. H. STOCKFELD 2,519,004

TAPE PRINTING AND PROJECTING DEVICE

Filed Jan. 15, 1946 3 Sheets-Sheet 2

Inventor
HARRY H. STOCKFELD

By Henninger and Pillars
Attorney

Aug. 15, 1950 H. H. STOCKFELD 2,519,004

TAPE PRINTING AND PROJECTING DEVICE

Filed Jan. 15, 1946 3 Sheets-Sheet 3

Inventor
HARRY H. STOCKFELD

By Henninger and Pillars
Attorney

Patented Aug. 15, 1950

2,519,004

UNITED STATES PATENT OFFICE 2,519,004

TAPE PRINTING AND PROJECTING DEVICE

Harry H. Stockfeld, New York, N. Y.

Application January 15, 1946, Serial No. 641,278

4 Claims. (Cl. 88—24)

This invention relates to devices for printing characters on tape and projecting images of said characters onto a screen and more particularly to a combined tape guiding and character projecting mechanism positioned immediately adjacent to the platen of a printing telegraph mechanism.

It is well known in the art to provide apparatus for projecting images of characters printed on transparent or translucent tape by stock quotation machines, telegraph printing machines and other data recording devices of similar character. However, due to the space requirements of projecting devices and elements of printing machines such as the type bars, platen, ribbon transporting system and associated mechanism, it has been customary to locate the projection field or frame opening of the projecting device a considerable distance from the character printing area. Thus with the tape traveling at the normal printing speed, this resulted in a time differential between the actual printing and the projection of a tape character. This delay between the printing and projection of the tape characters is particularly objectionable in the dissemination of timely information such as stock quotations and quotations made during the course of competitive bidding in the use of the Selling Control System described by me in Letters Patent No. 2,398,677, dated April 16, 1946.

In order to decrease the time differential between the printing of the characters and the projection of the images thereof, attempts have been made to locate the projection field or light aperture of the projection device as close as possible to the printing area. However, in order to accomplish this result within the limits heretofore known in the art, projecting mechanism employing elaborate prism systems have been attempted, expensive tape movement control arrangements have been suggested or resort has been made to the use of relatively slow types of printing mechanism such as devices employing rotating printing wheels positioned transversely with respect to the movement of the tape.

It is, therefore, an object of this invention to provide an improved projecting device associated with a tape printing mechanism employing a rotatable platen and a plurality of type bars which will project an image of a character or a series of characters with the shortest possible delay after the printing thereof.

Another object of this invention is to provide an improved device of the above described character wherein a light aperture or projection field of the projecting device is positioned immediately adjacent to the area in which the characters are printed on the tape by the printing mechanism.

Another object of the invention is to provide an improved tape guide or guideway containing a light aperture which serves to guide and support the printed tape immediately as it is moved from the platen of the telegraph typewriter mechanism.

A further object of the invention is to provide an improved tape character projecting and printing device wherein the supporting elements of the optical system serve to support a tape guide or guideway wherein is located a light aperture or projection opening immediately adjacent to the printing area.

A further object of the invention is to provide an improved printing and projection device for tape characters wherein a simple and relatively inexpensive optical system is employed.

A still further object of the invention is to provide an improved tape character projecting device through which the tape may be moved by the tape transporting mechanism which forms a part of a conventional telegraph typewriter mechanism.

The invention also resides in certain novel structural characteristics which facilitate the carrying out the foregoing objects and which contribute both to the simplicity of the combined printing and projecting device and to the ruggedness of construction as well as to the dependability of operation.

Other objects and advantages of the invention will become apparent from the following detailed description taken in connection with the accompanying drawings, in which.

Figure 1:
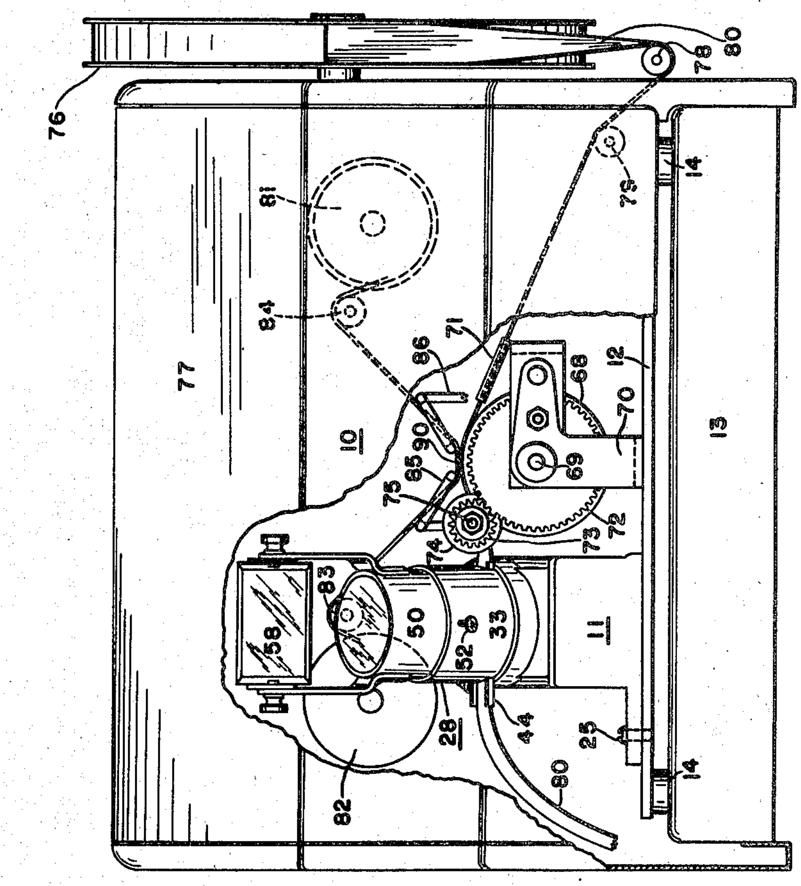
Figure 1 is a front elevation having a part of the casing broken away of a printing device and a projection device provided with a tape guide.

While the invention is susceptible of various modifications and alternative constructions, I have shown in the drawings and will herein describe in detail the preferred embodiment. It is to be understood, however, that I do not intend to limit the invention by such disclosure for I aim to cover all modifications and alternative constructions falling within the spirit and scope of the invention as defined in the appended claims.

Figure 3:
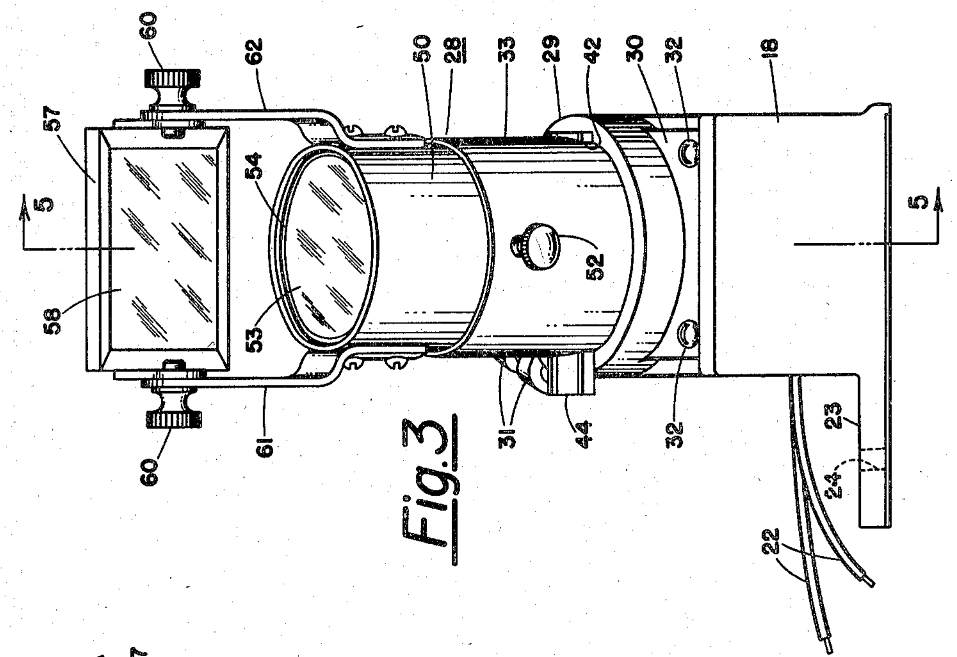
Figure 3 is an enlarged front elevation view of the combined tape guide and projecting device.
Figures 4, 6:
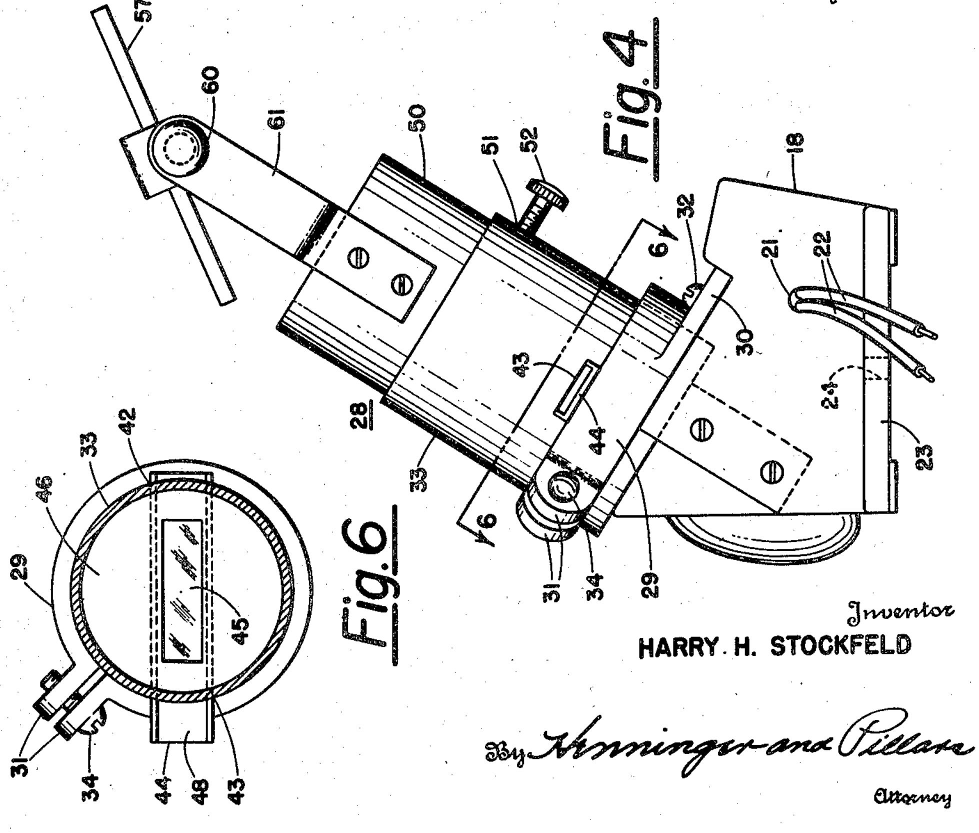
Figure 4 is an enlarged side view of the mechanism shown in Figure 3.
Figure 6 is a detailed sectional view taken on line 6—6 of Figure 4.
Figure 5:
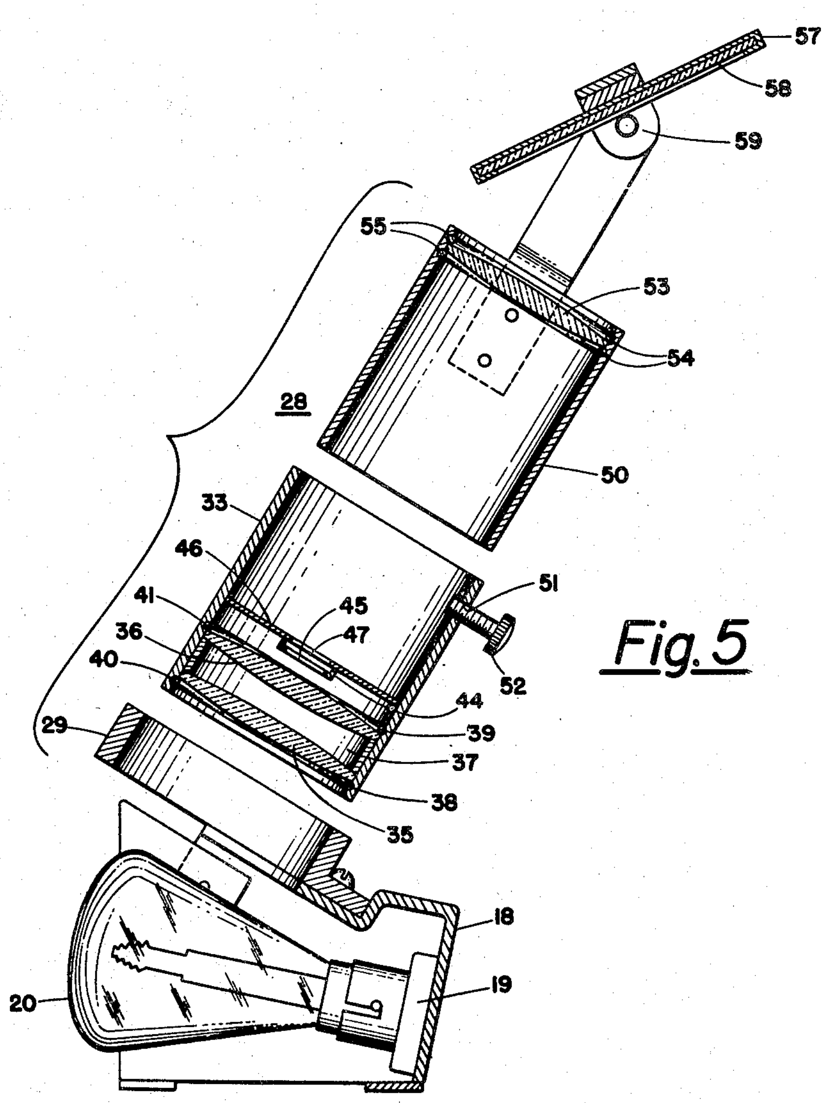
Figure 5 is an expanded detailed sectional view taken on line 5—5 of Figure 3.

Referring to Figure 1, the tape printing mechanism is indicated generally by reference numeral 10 and the tape guide and character projecting device is indicated by reference numeral 11. The printing mechanism and projecting device are supported by a frame 12 which is resiliently mounted on base member 13 by washers or spacers 14 formed of rubber, felt or other vibration-absorbing material. As is shown in Figures 3, 4, and 5, the projecting device 11 comprises a base member 18, the interior of which is formed to receive a projection lamp socket 19 and a projection lamp 20. An opening 21 is formed in one side of the base member to provide for the passage of insulated electrical conductors 22 which serve to connect the lamp socket 19 to a source of electrical energy (not shown) in order to illuminate the projection lamp 20. Base number 18 is provided with an extension 23 which has an opening 24 through which the base number 18 is secured to the frame 12 by screw means 25.

The telescoping double section lens barrel indicated generally by reference numeral 28 is secured to base 18 by a split annular ring 29 provided with an extension 30 and lugs 31 projecting on each side of the split section as shown in Figure 4. Extension 30 is provided with openings through which screws 32 are passed which are tapped into base number 18 to secure the split annular ring to the base member. As shown in Figures 3 and 4, the split annular ring 29 is secured at an angle to the plane of the base of approximately 60° for a purpose which will be described later. The lower section 33 of lens barrel 28 is frictionally secured within the split annular ring 29 after being adjusted into position by tightening screw means 34 which serves to draw together the projecting lugs 31. It will be noted that the lens barrel 28 extends upwardly at an angle to the vertical when secured in place in the annular ring.

As is shown best in Figure 5, the lower section 33 of lens barrel 28 is provided with condensing lenses 35 and 36 which are maintained in spaced relationship by an annular spacer 37 which fits inside lower section 33 and cooperates with the inside edges of the lens adjacent the periphery thereof. Each of the lenses is secured on the opposite side by spring rings 38 and 39 which are sprung into annular grooves 40 and 41 formed in the interior wall surface of the lower tube section 33. Apertures 42 and 43 are provided in the wall on directly opposite sections of the lower section 33 and a channeled guideway or tape guide 44 is positioned therethrough which extends centrally across the lower section 33 of the lens barrel 28. An opening 45 formed in the central web 48 of the tape guide 44 enables the light rays from the projection lamp 20 passing condenser lenses 35 and 36 to pass the tape guide and serves as a light aperture or frame opening to define the limits of the projection field. As is indicated in Figure 6, the light aperture is preferably formed with its opposite sides symmetrical to the optical axis of the projecting device. A circular disc 46 having a diameter slightly smaller than the inside diameter of section 33 is positioned within the lower section 33 of the lens barrel 28 immediately above the guideway 44 and is provided with an opening 47 which is similar in size to that of opening 45. The opening 47 is positioned in direct alignment with opening 45 located in the central web 48 of the tape guide 44. The circular disc 46 serves as a masking means for preventing all light rays except those passing through the projection field 45 from reaching the objective lens 53. If desirable, the edges of the channeled tape guide 44 may be secured to the circular disc 46 in order to increase the rigidity of the structure. The width and height of the channel way formed by tape guide 44 and circular disc 46 is such as to permit the passage of tape with a minimum of friction and to maintain the tape in a substantially flat condition.

The upper section 50 of lens barrel 28 is designed slightly smaller in diameter than the lower section 33 so that it may be adjustably telescoped into the lower section. A threaded opening 51 is provided in the lower section 33 which is tapped to receive the threads of thumb screw 52. By tightening down on thumb screw 52, the upper section 50 may be maintained in adjusted position. An objective lens 53 is secured in the upper part of the upper section 50 by spring rings 54 which cooperate with annular grooves 55 formed in the interior wall of section 50 at spaced intervals adjacent the top of the section.

From the description thus far given it will be apparent that when the projection lamp 20 is energized through conductors 22, light rays will be condensed by lenses 35 and 36 which will pass through the light aperture or projection field 45. Images of opaque, substantially opaque, or colored characters appearing on a transparent or translucent tape within the projection field will be projected by the device and may be focused on a screen positioned at right angles to the optical axis without distortion by adjusting the position of objective lens 53. In order that the images may be projected on a screen located at angles other than at right angles to the optical axis passing through the lens system, a reflecting mirror 58 is pivotally mounted above the objective lens in a frame 57 by threaded extensions 59 which cooperate with brackets 61 and 62. As is best shown in Figures 3, 4, and 5, the brackets 61 and 62 are secured to the upper section 50 of lens barrel 28 and are formed to permit rotary movement of the mirror 58 and frame 57. Tightening means 60 on each of the threaded extensions 59 are employed to secure the mirror in adjusted position. By adjustment of the objective lens 53 and mirror 58 images of tape characters located in the light aperture 44 may be focused on a screen 63 positioned in front of the projector as is shown in Figure 2.

Figure 2:
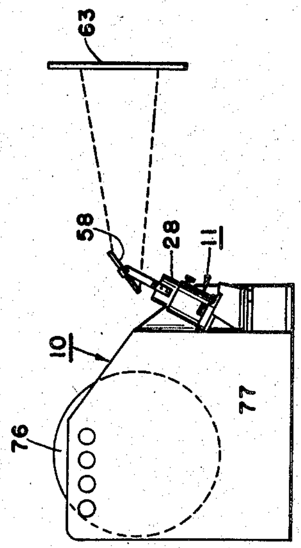
Figure 2 is a side view of a tape printing device and projector showing the manner of projecting tape images on a screen.

Reference numeral 10 shown in Figures 1 and 2 generally indicates one type of tape printing mechanism with which the above-described projecting device may be associated to secure the objects of this invention. In view of the fact that the details of tape printing telegraph mechanisms are known in the art, only a brief description will be given herein. A rotatable platen 68 is mounted on a shaft 69 which is driven by the mechanism of the telegraph typewriter device (not shown). The shaft 69 is journaled in a support 70 which is secured to the frame 12. A tape guide 71 is mounted on the support 70 to guide the tape as it moves toward the platen 68 from the supply spool. A gear 72 is mounted to rotate with the shaft 69 and platen 68 which meshes with a gear 73 that drives a feed roller 74 on shaft 75. The feed roller 74 is spring pressed against the platen by spring means in a well known manner. A tape 80 is guided from a tape supply spool 76 mounted adjacent to one side of the housing 77 of the printing mechanism 10 by rollers 78 and 79, through tape guide 71, over the top of the platen 68 and beneath the feed roller 74. The tape is formed of a transparent or translucent material upon which ink or coloring from a ribbon may be deposited and retained. Ink or color ribbon supply and take-up spools 81 and 82 are positioned within the housing 77 and the ribbon is guided therebetween by rollers 83 and 84 and guides 85 and 86 to the printing area 90 where the type bars strike on the section of the tape 80 located on the upper surface of platen 68.

As the type bars (not shown) selected by the printing mechanism enter the printing area 90 in succession, the ink or color in the ribbon is transferred progressively to the tape in accordance with the characters on the type bars. The mechanism for rotating the platen, actuating the type bars and operating the ribbon transporting system are well known in the telegraph typewriter art and form no part of the present invention. Rotation of the platen 68 and feed roll 74 serves to draw the tape through the printing area 90 where the characters are printed and as it passes from beneath the feed roller, it is immediately directed to the projection field of the projecting device 11 which is located immediately adjacent thereto. The lens barrel 28 of the projecting device is positioned in angular relation to the housing 77 of the telegraph printing mechanism in order that it may clear the ribbon spool 82 and type bars of the printing mechanism.

It will be apparent from the description set forth above that the projecting device described is adapted to be physically located immediately adjacent to the tape printing mechanism in order that the tape may pass to the projection area so that a minimum of delay will occur between the printing of the characters on the tape and the projection of the images thereof. Further it is evident that the channeled guideway or type guide 44 which is provided with the light opening serving to define the limits of the projection field functions not only to direct the moving tape away from the platen and feed roll, but also serves to direct the printed tape through the projection field of the printing device.

I claim:

1. In a tape printing and projecting device, the combination comprising a tape transporting and character printing mechanism provided with a rotatable platen to support a tape on which characters are printed in a printing area by type bars, a transparent tape, a tape guide provided with a light aperture positioned immediately adjacent to said printing area to receive the printed tape as it leaves the platen, said projecting device comprising a base member supported on said mechanism, a projecting lamp positioned within said base member, a condensing lens-equipped barrel supported by said base member and extending upwardly therefrom in acute angular relationship to the base of said member, an objective lens, an objective lens supporting barrel adjustably supported by and in optical alignment with said condensing lens barrel and means for supporting said tape guide by said condensing lens barrel to position said light aperture in the optical axis of the projecting device intermediate said condensing and objective lenses.

2. In a tape character projecting device for use with a tape telegraph printing mechanism, the combination comprising a base member formed with an upper portion in angular relation in respect to the bottom thereof, a lens barrel extending from said base member in an acute angular relationship thereto, a split annular member in which said lens barrel is frictionally secured, means for securing said split annular member to said base member, a light source positioned within said base member and supported thereby, a condensing lens positioned adjacent to said light source and mounted in one end of said lens barrel, an objective lens supported by and positioned adjacent to the opposite end of said lens barrel, and a channelled tape guide supported by and extending through said lens barrel intermediate said condensing and objective lenses having a light aperture defining a projection field formed therein.

3. In a tape character projecting device for use with tape telegraph printing mechanism, the combination comprising a base member, a double section lens barrel having a first section adapted to telescope with respect to a second section, a condensing lens mounted in one end of said second section, a split annular member in which said second section is frictionally secured, means for securing said split annular member to said base member, a light source supported by said base member and positioned in the optical axis adjacent to said condensing lens, said first section provided with an objective lens, a tape guide supported by and extending through said first section intermediate said condensing and objective lenses having a light aperture formed therein and means to prevent the passage of all light rays through said lens barrel except those passing through said light aperture.

4. In a tape printing and projecting device, the combination comprising a mechanism for printing characters on a tape, a transparent tape, a projecting device positioned immediately adjacent to said printing mechanism for projecting images of said printed characters, said projecting device comprising a base member supported on said mechanism, a projection lamp positioned within said base member, a condensing lens barrel supported by said base member having a condensing lens mounted in one end thereof, a guide means supported by said condensing lens barrel for directing said tape through the projection field of said device immediately after it leaves said printing mechanism, an objective lens barrel adjustably supported by and in telescoping relation with said condensing lens barrel and serving to support an objective lens in the optical axis of the device, and a single tape moving mechanism for moving said tape through said printing mechanism and projecting device in accordance with the printing operation.

HARRY H. STOCKFELD.

REFERENCES CITED

The following references are of record in the file of this patent:

UNITED STATES PATENTS

| Number | Name | Date |
|---|---|---|
| 908,668 | Heyl-Dia | Jan. 5, 1909 |
| 1,341,667 | Ott et al. | June 1, 1920 |
| 1,545,674 | MacKay | July 14, 1925 |
| 1,666,305 | Proctor | Apr. 17, 1928 |
| 1,711,909 | Stalcup | May 7, 1929 |
| 1,763,844 | Decker | June 17, 1930 |
| 1,794,147 | Chidester | Feb. 24, 1931 |
| 1,969,440 | Wheeler et al. | Aug. 7, 1934 |
| 1,980,160 | Benjamin et al. | Nov. 13, 1934 |
| 2,030,821 | Long et al. | Feb. 11, 1936 |
| 2,046,696 | Pfannenstiehl | July 7, 1936 |
| 2,108,053 | Eitzen | Feb. 15, 1938 |